Figure 1:
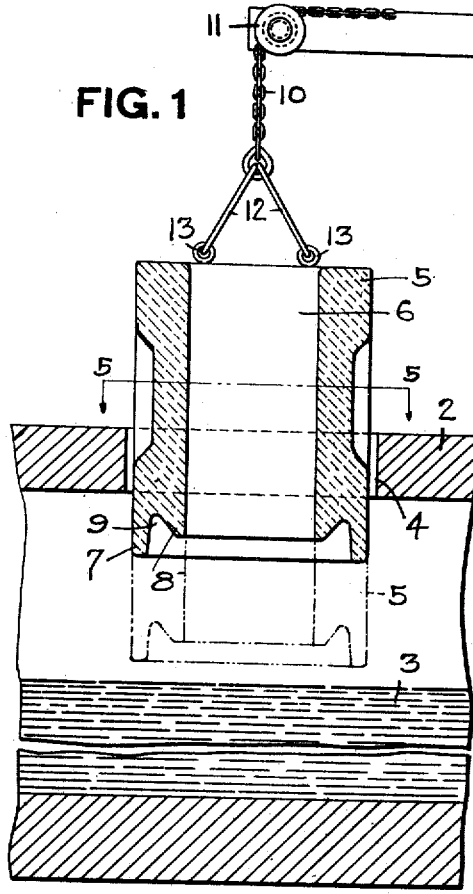

F. M. FRANCART.
DEVICE FOR USE IN CONNECTION WITH THE DRAWING OF GLASS CYLINDERS.
APPLICATION FILED APR. 17, 1916.

1,272,652.

Patented July 16, 1918.

INVENTOR

UNITED STATES PATENT OFFICE.

FERNAND M. FRANCART, OF SPRINGDALE, PENNSYLVANIA.

DEVICE FOR USE IN CONNECTION WITH THE DRAWING OF GLASS CYLINDERS.

1,272,652.  Specification of Letters Patent.  Patented July 16, 1918.

Application filed April 17, 1916. Serial No. 91,779.

*To all whom it may concern:*

Be it known that I, FERNAND M. FRANCART, a citizen of the United States, and resident of Springdale, in the county of Allegheny and State of Pennsylvania, have invented a new and useful Improvement in Devices for Use in Connection with the Drawing of Glass Cylinders; and I do hereby declare the following to be a full, clear, and exact description thereof.

My invention relates to a device for use in connection with the drawing of glass cylinders.

In the drawing of glass cylinders for the manufacture of window-glass, the method most commonly employed consists in lowering a bait into the body of molten glass, withdrawing the bait so that the glass adhering thereto is formed into the shape of a cylinder, sufficient air being admitted to hold the glass in cylinder form. In the practice of this method, difficulties have arisen due to the impurities in the glass, and which are drawn up in the formation of the cylinder, and which result in imperfections in the glass, and the production of glass of poor quality.

The object of my invention is to provide means for removing the impurities which collect upon the surface of the glass within the drawing area and so provide a practically pure glass for the cylinder, thereby greatly improving the quality of the glass.

A further object of my invention is to provide a simple means for the disconnecting of the blown cylinder from the body of molten glass.

To these ends my invention consists, generally stated, in providing means for depressing the glass around the drawing area, whereby the surface of the glass is lowered around the drawing area and the impurities flow to this depressed portion, and means for trapping the impurities outside the drawing area, thereby leaving the glass practically pure in the drawing area from which the glass is drawn to form the cylinder.

My invention further consists in protecting the lower end of the cylinder from the heat of the furnace during the drawing operation and withdrawing such protection when the cylinder is drawn so that the heat of furnace melts off the lower end of said cylinder and disconnects it from the molten mass of glass.

Figure 2:
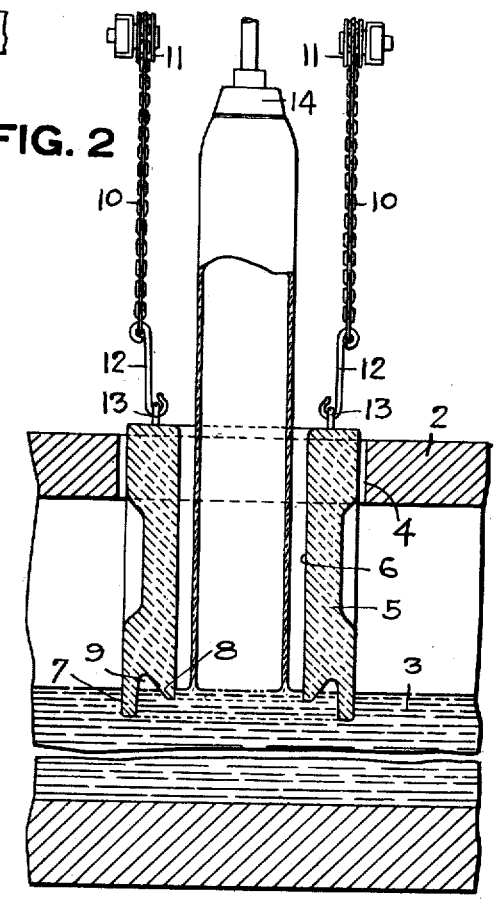
Figure 3:
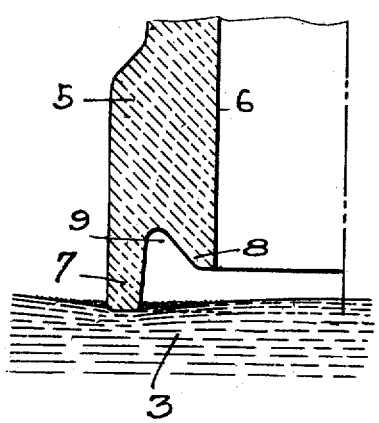
Figure 4:
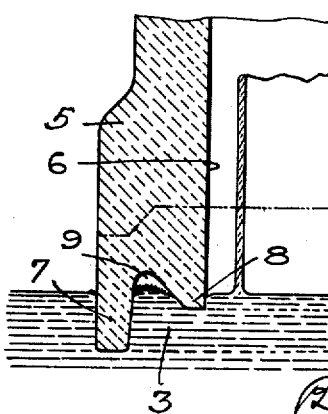
Figure 5:
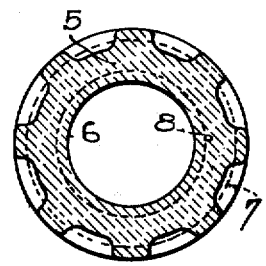

In the accompanying drawing. Figure 1 is a sectional view of a portion of a tank showing my improved device, in raised position, and also in vertical section; Fig. 2 is a like view showing the device lowered in position for use; Fig. 3 is an enlarged detail showing the manner in which the glass is depressed; Fig. 4 is a like view with the device in position during the drawing operation; and Fig. 5 is a section on the line 5—5, Fig. 1.

In the drawing, the numeral 2 designates a suitable tank or pot containing the molten glass 3. This pot or tank has the opening 4 through which the drawing operation takes place, and within said opening. I insert the device 5, which is preferably circular in form and formed of fire-clay or other suitable refractory material. The device 5 is provided with the central passage 6 through which the cylinder is drawn and through which the bait is raised and lowered.

At the lower end of the device 5 is the skirt 7, which projects below the body of the device, and inside said skirt is the ring-portion 8, which forms between said ring-portion and said skirt the recess or trap 9.

This skirt portion may be formed separate from the main body of the device, so that when it is worn out it may be replaced by a new portion.

The device 5 is raised and lowered by means of the chains 10, which pass around the pulley 11, and are connected to the links 12 at opposite sides of the device, said links being connected to the eyelets 13. In this manner, the raising and lowering device in no way interferes with the drawing of the cylinder.

The device 5 is of such size as to pass readily through the opening 4, while at the same time, it acts to practically close the opening to prevent the escape of heat.

In the operation of my device, the same is lowered through the opening 4, and when the skirt 7 strikes the surface of the molten glass, the glass will be depressed, as indicated in Fig. 3, for it will be understood that the glass has such viscosity that the skirt will not at once sink into the glass, but will tend first to depress the same so that the glass contained within the area of the device will flow toward the skirt, and as the impurities are carried on the surface of the glass, these impurities will flow toward the skirt, and upon further lowering of the device, the skirt will sink down into the body of glass and the ring 8 will likewise be submerged, the impurities being trapped within the space 9, as indicated in Fig. 4. If desired, vents may be formed in the skirt 7 which will permit the air trapped in the space 9 to escape as well as the impurities. The bait 14 is then lowered in the ordinary manner down through the opening 4, and the glass in the drawing area inclosed by the device becomes attached to the bait in the ordinary manner, and the glass is drawn up to form the cylinder.

It will be observed that by my device the impurities which were floating upon the glass at the drawing area are floated off before the bait is lowered, consequently, only the pure glass becomes attached to the bait, and the drawing of the cylinder takes place from the purified area. As soon as the top surface containing the impurities is floated off, the glass below is practically pure in quality and the cylinder is made up of practically pure glass, and a finer quality of glass is obtained.

Furthermore, when the device is lowered into the glass, as indicated in Fig. 2, it protects the cylinder from the heat of the furnace during the drawing operation.

And when the cylinder is drawn by lifting said device above the molten glass as indicated by dotted lines, Fig. 1, the heat of the furnace will melt off the lower end of the cylinder and free it from the mass of molten glass.

I do not wish to confine myself to the device illustrated but include within the scope of my invention such changes and modifications within the scope of my invention as may be found possible to achieve the same results.

What I claim is:

1. A device for use in the drawing of glass cylinders comprising a member through which the glass is drawn adapted to be depressed into the glass around the drawing area whereby the surface impurities flow from the drawing area toward said depression, and means on said device for trapping the impurities outside the drawing area.

2. A device for use in connection with the drawing of glass cylinders having a passage extending through it, a skirt at the lower end thereof, and an inside ring-portion above the lower end of said skirt and forming between said ring and said skirt a trap or recess.

In testimony whereof, I the said FERNAND M. FRANCART, have hereunto set my hand.

FERNAND M. FRANCART.

Witnesses:
M. J. E. SWAIN,
M. J. SWAIN.